United States Patent
Chen et al.

(10) Patent No.: US 6,324,646 B1
(45) Date of Patent: Nov. 27, 2001

(54) METHOD AND SYSTEM FOR SECURING CONFIDENTIAL DATA IN A COMPUTER NETWORK

(75) Inventors: David De-Hui Chen; Joseph Brendan Kerr, both of Cary; Stephen Anton Owen, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/150,977

(22) Filed: Sep. 11, 1998

(51) Int. Cl.[7] ............ G06F 12/14; G06F 17/30; H04L 9/32
(52) U.S. Cl. .......... 713/201; 707/103 R; 709/313
(58) Field of Search ........... 713/200, 201, 713/164, 167, 194; 707/103, 103 R, 103 Y, 103 Z; 709/310, 313, 315, 316, 317

(56) References Cited

U.S. PATENT DOCUMENTS

| | | | |
|---|---|---|---|
| 4,993,069 | 2/1991 | Matyas et al. | 380/23 |
| 5,440,633 | 8/1995 | Augustine et al. | 380/23 |
| 5,511,122 | 4/1996 | Atkinson | 380/25 |
| 5,517,622 | 5/1996 | Ivanoff et al. | 395/200.13 |
| 5,524,052 | 6/1996 | Augustine et al. | 380/49 |
| 5,577,209 | 11/1996 | Boyle et al. | 395/200.06 |
| 5,640,456 | 6/1997 | Adams, Jr. et al. | 380/49 |
| 5,673,322 | 9/1997 | Pepe et al. | 380/49 |
| 5,689,565 | 11/1997 | Spies et al. | 380/25 |
| 5,699,513 | 12/1997 | Feigen et al. | 395/187.01 |
| 5,845,281 * | 12/1998 | Benson et al. | 707/9 |
| 5,892,899 * | 4/1999 | Aucsmith et al. | 713/200 |
| 6,044,468 * | 3/2000 | Osmond | 713/201 |
| 6,173,404 * | 1/2001 | Colburn et al. | 713/200 |
| 6,175,925 * | 1/2001 | Nardone et al. | 713/200 |
| 6,178,509 * | 1/2001 | Nardone et al. | 713/200 |
| 6,205,550 * | 3/2001 | Nardone et al. | 713/200 |

FOREIGN PATENT DOCUMENTS

WO9508232    3/1995   (WO) .............. H04L/9/08

* cited by examiner

*Primary Examiner*—Norman M. Wright
*Assistant Examiner*—Christopher A. Revak
(74) *Attorney, Agent, or Firm*—Gerald R. Woods; Bracewell & Patterson, LLP

(57) ABSTRACT

A method and system for securing confidential data in a computer network, wherein the computer network includes a management information database that assists in the management of the computer network. Initially, confidential data are identified within the management information database. Next, particular data objects are associated with the identified confidential data. Thereafter, the identified confidential data are accessed from the management information database. Finally each particular data object and its associated confidential data are automatically converted into a secure data object, in response to accessing the confidential data from the management information database, such that the confidential data may only be understood or altered external to the management information database by converting the secure data object back into the particular data objects and the associated confidential data. The particular data objects may comprise primitive data objects while the secure data object may be composed of an opaque data object. Network management format and conventions may be governed by a network management protocol.

39 Claims, 11 Drawing Sheets

FIG. 6

| MESSAGE FIELD NAME | OCTET NUMBER | DESCRIPTION | SECURITY |
|---|---|---|---|
| 0x02 | 1 | no security | clear |
| Type | 2 | SNMP type tag | clear |
| Length | 3..4 | length of data | clear |
| Data | 5..n | data value | clear |
| +SHA-1 digest | 5+n+1+20 | secured data | digest |

FIG. 7

| MESSAGE FIELD NAME | OCTET NUMBER | DESCRIPTION | SECURITY |
|---|---|---|---|
| 0x03 | 1 | privacy/authentication | clear |
| +DES seed | 2..9 | initialization vector | clear |
| +DESEncrypedData | 10..10+n | secured data | encrypted |
| +SHA-1 digest | 10+n+1+20 | secured data | digest | where:
   + denotes concatenation
   the number in parenthesis denotes the length of the field
   DES IV seed (Initialization Vector) = 8 bytes non-reoccuring value
   DES IV (Initialization Vector) = SysUpTime(4) + SeqNo(4)
   DESEncryptedData = Length(2)+Data
      Tag    = the SNMP tag of the data to be encrypted
      Length = the length of the data to be encrypted
      Data  = the data to be encrypted
   SHA-1digest " SHA=1 digest covers the following fields which have
     their octet sizes in parentheses:
     (0x02(1) + DESseed(8) + DESEncryptedData(n*8) + OID)
   OID :
      the Object Identifier represented as an array of 4 byte entries
      one for each level of the naming tree used in the OID.
      The bytes are transmitted in network order.

FIG. 8

```
SecureOctetString ::= TEXTUAL-CONVENTION
    STATUS          current
    DESCRIPTION
        "This syntax describes an octet string to which a security
        mechanism may be applied. The output of the security transform
        is an octet string. The description of the security
        mechanism is provided by a single octet security descriptor
        field that precedes the secured data. The level of security
        on the data and the security mechanism used to protect the
        data may vary according to the security descriptor field.

The security mechanism is described in
        Figures 5, 6, 7 above.
        "
    SYNTAX    OCTET STRING (SIZE (0 .. 65535))

Within a MIB the following object definition would be used:

Object1  OBJECT-TYPE
    SYNTAX          SecureOctetString
    MAX-ACCESS      read-create
    STATUS          current
    DESCRIPTION
        "An octet string object that utilizes the secure object syntax."
    ::= { groupTableEntryTC 1 }
```

FIG. 9

```
SecureOctetString :: = TEXTUAL-CONVENTION
    STATUS          current
    DESCRIPTION
        "This syntax describes an INTEGER to which a security
        mechanism may be applied. The output of the security transform
        mechanism is an octet string. The description of the security
        mechanism is provided by a single octet security descriptor
        field that precedes the secured data. The level of security
        on the data and the security mechanism used to protect the
        data may vary according to the security descriptor field.

The security mechanism is described in Figures 5, 6, 7 above.
        "
    SYNTAX    OCTET STRING (SIZE (0 .. 65535))

Object1  OBJECT-TYPE
    SYNTAX         SecureInteger
    MAX-ACCESS     read-create
    STATUS         current
    DESCRIPTION
        "An integer object that utilizes the secure object syntax."
    :: = { groupTableEntryTC 2 }
```

FIG. 10

```
SecureOctetString :: = TEXTUAL-CONVENTION
    STATUS          current
    DESCRIPTION
        "This syntax describes an OBJECT IDENTIFIER to which a security
        mechanism may be applied. The output of the security transform
        mechanism is an octet string. The description of the security
        mechanism is provided by a single octet security descriptor
        field that precedes the secured data. The level of security
        on the data and the security mechanism used to protect the
        data may vary according to the security descriptor field.

The security mechanism is described in Figures 5, 6, 7 above.
        "
    SYNTAX   OCTET STRING (SIZE (0 .. 65535))

Object1  OBJECT-TYPE
    SYNTAX       SecureObjectIdentifier
    MAX-ACCESS   read-create
    STATUS       current
    DESCRIPTION
        "An Object Identifier object that utilizes the secure object syntax."
    :: = { groupTableEntryTC 3 }
```

102

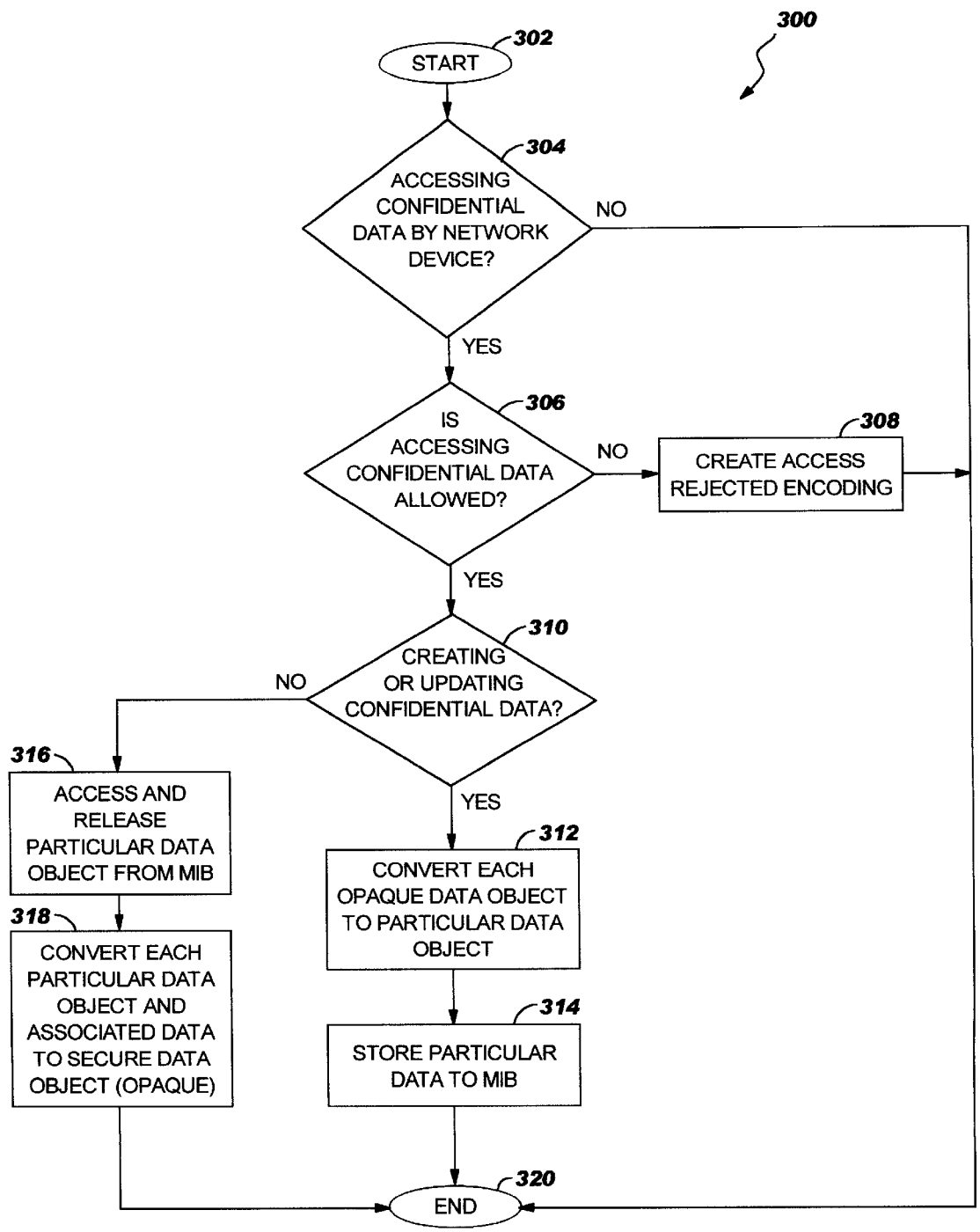

METHOD AND SYSTEM FOR SECURING CONFIDENTIAL DATA IN A COMPUTER NETWORK

BACKGROUND OF THE INVENTION

1. Technical Field

The present invention relates to information retrieval methods and systems. In particular, the present invention relates to computer networks in which data may be accessed, stored, updated, and retrieved. Still more particularly, the present invention relates to methods and systems for protecting confidential data that may be accessed, stored, updated, and retrieved from a database within a computer network.

2. Description of the Related Art

Certain network management data stored within a Management Information Base (MIB) of an agent system within a computer network are highly confidential. Access to the network management data stored within the MIB must be provided to network devices, such as network managers and so-called World Wide Web "browsers," well known in the art of computer networking. Normal network management operational procedures within agent systems of a computer network must be capable of utilizing confidential MIB data to perform arithmetic operations, comparisons, and initializations. Therefore, such confidential MIB data must operate within existing operating systems and hardware. Unauthorized access and changes to the confidential data by network managers or browsers should not be allowed. While retrieval of the confidential MIB data must be allowed, the viewing of the actual contents of the confidential MIB data must only be allowed to authorized network managers or browsers.

Any network manager or browser may access the MIB data information and learn its contents. The only access limitation is the use of "community name" strings, which are analogous to passwords, which limit access to the MIB data and the ability to modify the MIB data. The MIB data itself is not restricted, rather the ability to access this data and perform changes to the data is limited via such "community name" strings. The "community name" string and the MIB data can still be viewed by eavesdropping of messages, because there is not an explicit requirement to protect data in transit. Such password strings are administered to managers or browsers and are designed to apply to the whole MIB, or to MIB "views," which are subsets of one or more individual MIB objects or related objects referred to collectively as a MIB "subtree". Therefore, unless the ability to access and perform changes upon the MIB data is protected in some manner, little or no security can be offered to customers in need of confidential MIB data.

Current techniques for securing network management data are limited by several factors. First, current methods for securing network management data are administratively cumbersome. For example, password or community strings must be given out to all network managers or browsers needing access to confidential data. An orthogonal set of MIB objects can exist for each MIB user for which network management operations are allowed. Therefore, the list of authorized users, combined with the list of network management permissible MIB objects, may become large. Second, current methods for securing network management data do not provide password security. Community strings typically are set and changed in network management messages in the clear. Therefore, the very secret, that is to be used to gain access to secure data, is itself not secure. Finally, the MIB data itself is not protected. The MIB data that is protected by the community string password flows in the clear in network management messages.

Recent developments in the area of securing access to network management data include the "SNMP Version 3.0," which is a user based security method and system for the authentication and encryption of SNMP messages containing MIB data. SNMP messages containing MIB data is authenticated and encrypted, according to "SNMP Version 3.0" by securing the complete message, and screening requests and responses for permission through the use of "context views." Such "views" are established by the prior coordination of the "user name" with a password key through manager or off-line interaction. The password does not flow in the encrypted message. Rather, only the user name that is utilized to access the password key to encrypt or decrypt the message flow in the encrypted message. Each target system is assigned a unique "engine identification," which coupled with "engine boot" and "engine time" parameters that flow in the message allow the target system to verify that the message has not been replayed (i.e., not fresh) or captured and replayed to a different target system. Such an approach is quite elaborate and expensive to implement and administer.

Confidentially sensitive MIB data must be able to be sent to all requesters, but be able to be revealed only to those readers who are authorized. Only authorized network managers or browsers may be permitted to change the confidential MIB data. Only authorized network managers or browsers may be permitted to change the confidential MIB data by creating or deleting the context in which the secure MIB data exists. Furthermore, sensitive MIB data must be able to coexist in the same SNMP table construct as non-sensitive data and the non-sensitive data must be read and set as normal operational needs require. Based on the foregoing, it can thus be appreciated that a need exists for a method and system which would insure that confidential data released from a network database, such as an MIB, is efficiently and effortlessly secured.

SUMMARY OF THE INVENTION

It is therefore one object of the present invention to provide for an improved information retrieval method and system.

It is therefore another object of the present invention to provide for an improved computer network in which data may be retrieved and accessed.

It is yet another object of the present invention to provide an improved method and system for protecting confidential data that may be retrieved from databases within a computer network.

The above and other objects are achieved as is now described. A method and system for securing confidential data in a computer network, wherein the computer network includes a management information database that assists in the management of the computer network. Initially, confidential data are identified within the management information database. Next, particular data objects are associated with the identified confidential data. Thereafter, the identified confidential data are accessed from the management information database. Finally each particular data object and its associated confidential data are automatically converted into a secure data object, in response to accessing the confidential data from the management information database, such that the confidential data may only be understood or altered external to the management information database by converting the secure data object back into the particular data objects and the associated confidential data. The particular data objects may comprise primitive data objects while the secure data object may be composed of an opaque data object. Network management format and conventions may be governed by a network management protocol.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

FIG. 6 depicts a block diagram of a level of security in which authentication but no encryption exists, according to a preferred embodiment of the present invention;

FIG. 7 depicts a block diagram of a level of security in which a secure MIB data message format with encryption and authentication exist, according to a preferred embodiment of the present invention;

FIG. 8 is a block diagram illustrative of an octet string syntax, in accordance with a preferred embodiment of the present invention;

FIG. 9 is a block diagram illustrative of a secure integer syntax, in accordance with a preferred embodiment of the present invention;

FIG. 10 is a block diagram illustrative of an object identifier syntax as a value or data protocol, in accordance with a preferred embodiment of the present invention;

FIG. 15 depicts a high-level flowchart of operations further illustrating a method for securing confidential data maintained in a management information database, in accordance with a preferred embodiment of the present invention.

DETAILED DESCRIPTION OF PREFERRED EMBODIMENT

Figure 1:
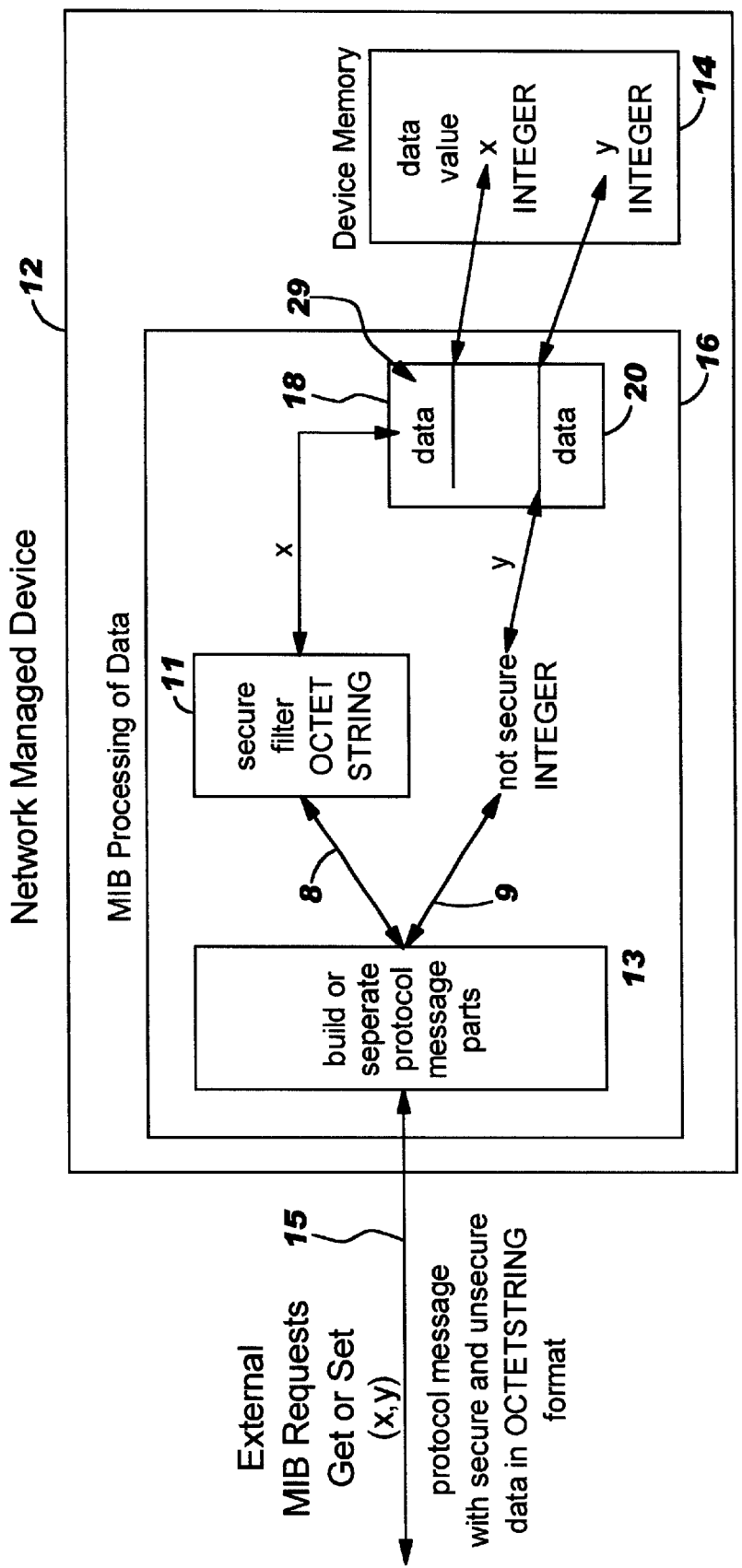
FIG. 1 depicts a schematic diagram of a network managed device, in accordance with a preferred embodiment of the present invention.

With reference now to the figures and in particular with reference to FIG. 1, there is depicted a schematic diagram 10 of a network managed device 12, in accordance with a preferred embodiment of the present invention. The network managed device 12 includes a device memory 14 and a Management Information Base 16. Management Information Base 16 is a management information database within a computer network, and assists in the management of the computer network. MIB processing of data is illustrated via Management Information Base 16 in FIG. 1. Network management MIB data 18 is defined using specific formats and syntax conventions, such as a network protocol. For the network management format and convention referred to as Simple Network Management Protocol (SNMP), formal primitives exist that define the base types of the data that can be manipulated by network mangers and browsers. Examples of these primitive or simple data types for the SNMP include, but are not limited to "INTEGER," "OCTET STRING," "OBJECT IDENTIFIER," and "NULL." Those skilled in the art will of course appreciate that these primitive or simple data types are presented herein as merely illustrative examples, and that a variety of other primitive or simple data types may be utilized in accordance with a preferred embodiment of the present invention.

In securing MIB data 18, an agent system containing the data must still be able to operate with MIB data 18 as it normally does. Therefore, MIB data 18 must retain its original primitive SNMP data type definition. However, when MIB 18 data is accessed or set by network managers or browsers, the data must be protected. FIG. 1 demonstrates two subsets of MIB data 18 as MIB data 19 and MIB data 20. MIB data 20 is unsecured data, while MIB data 19 is secured data, according to a preferred embodiment of the present invention. If MIB data 18 is defined according to a preferred embodiment of the present invention as described herein, then access to MIB data 18 is possible, but learning or setting the contents of the data is only provided by having knowledge of the security mechanism utilized to secure the MIB data. The invention presented herein thus describes a method and system for incorporating security confidential MIB data by defining new primitives types that have a secure behavior when being retrieved or set.

Several elements are key to any implementation of a preferred embodiment of the present invention. First, a unique extension of the syntax of SNMP must be implemented in order to permit the definition of one or more new "Textual Conventions" that themselves permit secure data primitives to operate natively within the network device or other MIB, while resulting in a security mechanism when the MIB data is provided exterior to the Management Information Base or changed by an exterior command. Second, the security mechanism applied to secure MIB data is implemented as a filter that transposes the primitive type into an opaque data type. All primitive types are converted to this primitive opaque type when they exit the MIB control in a protocol message. Any change to a secure MIB data type received must undergo the security filter to reverse the opaque filtering by a security mechanism and be validated prior to effecting a change to the secure MIB data. Third, to prevent brute force manipulation of the SNMP MIB operation, a special case of the secure MIB data filter may be applied to conventions that effect the general operation of the MIB contents, such as, the "RowStatus" definition.

The problem of protecting confidential SNMP data is solved by the definition of a set of Textual Conventions for each SNMP primitive data type, such as "Secure INTEGER," "SecureOCTETSTRING," "SecureObjectIdentifier," and "SecureNULL". These Textual Conventions define a mapping or conversion function, (i.e., a security mechanism) that when applied to the SNMP base primitive type results in a piece of data that is opaque (i.e., an opaque data object). The data can be subsequently examined, however its meaning cannot be understood without knowledge of how the security mechanism functions. Therefore, the textual convention converts all SNMP primitive data types into a single SNMP data type, OCTETSTRING, to which a security mechanism is applied.

The overall process by which this is accomplished is provided in the schematic diagram of FIG. 1 for MIB data type of INTEGER, as indicated specifically at Management Information Base 16. In FIG. 1, MIB data 19 are secured via secure filter 11. MIB data 19 comprises X integer data values, while MIB data 20 comprises Y integer data values, each of which are retrieved from device memory 14. MIB data 20, retrieved from Management Information Base 16 is not run through a secure filter. MIB data 20 is not secure, while MIB data 19, after being filtered by secure filter 11, is secure. All SNMP data is converted to OCTETSTRING when the data flows over a communications medium (e.g., wire, fiber optic cable, radio signal, etc.) in a message, according to the Basic Encoding Rules (BER) which define the transfer syntax for messages. The Basic Encoding Rules are well known in the art. However, those skilled in the art will appreciate that although all SNMP data is converted to OCTETSTRING when flowing on a wire, according to the BER, this does not mean that the data is an encrypted secureOCTETSTRING. MIB data also flows in the message OCTETSTRING, but it is not secure. Block 13 indicates a processing operation in which protocol message parts may be built or separated. Block 13 illustrates a process in which secure and unsecured data items may be combined into one protocol message. Of course, if there are no secure parts or no unsecured parts available, the message will be of one type only. Arrow 15 indicates the result of the operation described at block 13. Arrow 15 illustrates the transfer of a protocol message with secure and unsecured data in the OCTETSTRING format. Arrows 8 and 9 respectfully illustrate the flow of secure and unsecured data.

Figure 2:
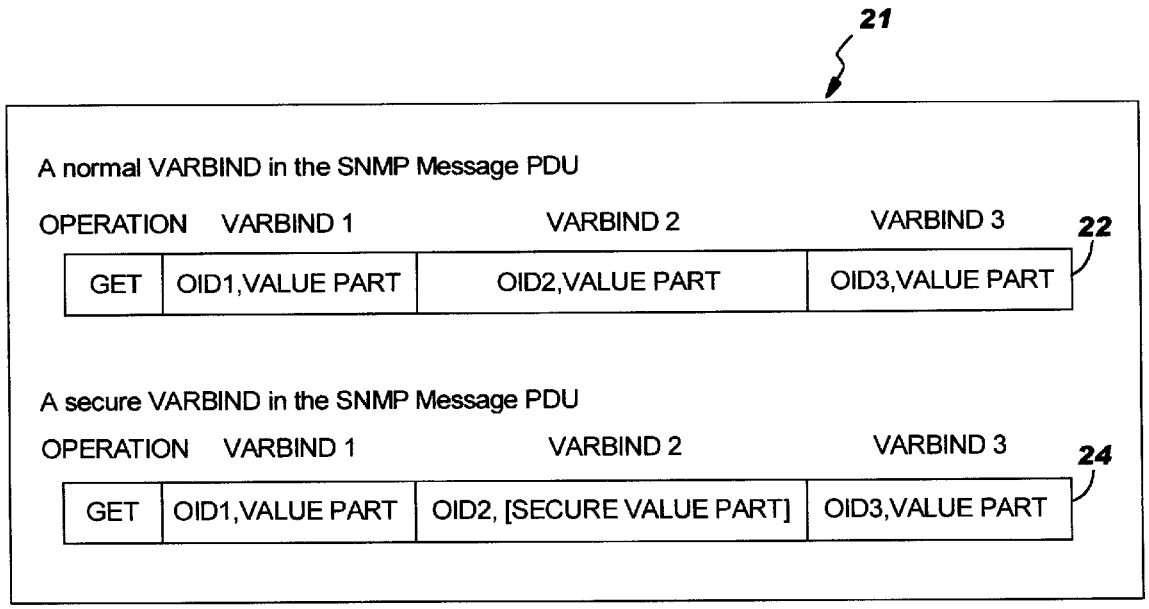
FIG. 2 illustrates a block diagram illustrative of an abstraction of a network protocol message, in both a normal mode and a secure mode, in accordance with a preferred embodiment of the present invention.

The SNMP Message Protocol Data Unit is composed of several parts. Of key interest, however, are the "Variable Bindings," which may be referred to as "VARBINDS". Each VARBIND is composed of two parts: an identifier, referred to as an "Object Identifier," and a value part, representing the "value" of the MIB data according to a predefined syntax. The result of utilizing such a convention, according to a preferred embodiment of the present invention, is that the SNMP data that flows applies security to the second portion of the VARBIND (i.e., the value component for those SNMP MIB objects whose syntax is specified by the secure syntax). The invention described herein, with respect to the use of the SNMP VARBIND convention, does not secure the OID (identification part), only the associated "value" portion," which permits browsers and network managers to observe the identifier of the data object and possibly display an associated label identifying the data object, while not compromising the value associated with the data object if it is secured. Such an approach allows the manager to "see" the OID and the secureOCTETSTRING and display the OID and associated semantic labels, while requiring the secureOCTETSTRING to be displayed as an OCTETSTRING, because the manager cannot decode this value part without authorization. The manager (or browser) will also not have knowledge of the primitive data type of the data value. FIG. 2 illustrates a block diagram 21 illustrative of an abstraction of the SNMP message with VARBINDS, in both a normal mode 22 and a secure mode 24, in accordance with a preferred embodiment of the present invention.

Figure 3:
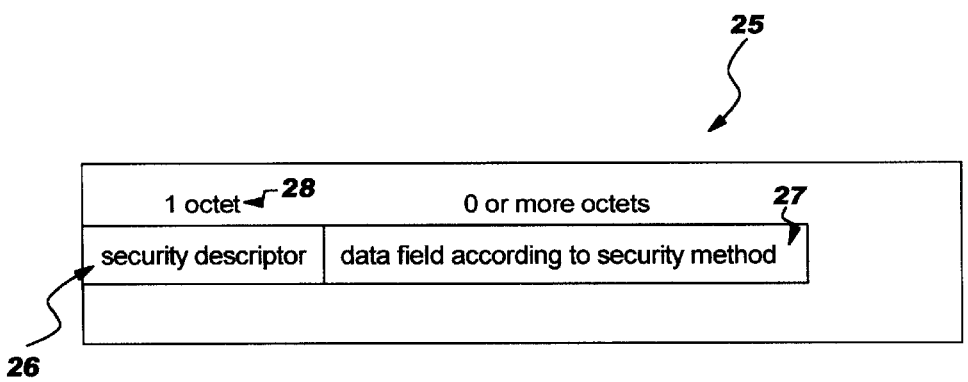
FIG. 3 depicts a block diagram illustrating how data is secured in a protocol message, according to a preferred embodiment of the present invention.

FIG. 3 depicts a block diagram 25 illustrating how data can be secured in a protocol message, according to a preferred embodiment of the present invention. The description of the security mechanism is provided by a single octet security descriptor field 26 that precedes the secured data. The level of security on the data and the security mechanism used to protect the data may vary according to the security descriptor field 26. Security descriptor field 26 is composed of the first octet 28 of the octet string data field. The security data field according to the security method described herein is indicated at reference numeral 27, beneath the heading "0 or more octets." A key point in understanding the security descriptor field and the security data field, as utilized in accordance with a preferred embodiment of the present invention, is that both the security descriptor field and the security data field are part of the VARBIND value. Even the secured value part has a clear component (i.e., the security descriptor) while the security data field is secured (or not) according to the indicative provided by the security descriptor field.

Based on the foregoing, those skilled in the art can appreciate that there is no limit, according to the present invention, to the type of security applied to the data. All that is required is a new security descriptor field identifier, whose implementation can be understood by communicating parties. This is a significant feature, because this security descriptor field permits the upgrading of security mechanisms on a frequent basis. While the security descriptor field is currently defined as 1 octet for conciseness, for general extensibility, a much larger security descriptor field (e.g., 4 octets) provides more flexibility. A larger security descriptor field provides the administrative ability to evolve within a security mechanism, variations of the security theme. This is particularly important to "e-commerce" or other sensitive transactions that desire to utilize this form of targeting specific data elements as secure, while permitting considerable variation in mechanisms due to a number of target users.

In FIG. 4, FIG. 5, FIG. 6, and FIG. 7 illustrated and described herein, the description of the VARBIND "value" portion when security mechanisms are activated is presented. FIG. 4 to FIG. 7 illustrate the message content of the VARBIND "value" portion. The "value" portion is composed of a Message Field Name which is 1 octet long and identifies the security mechanism. The Message Field Name always flows in the clear (i.e., without security). The remainder of the value portion (i.e., after the Message Field Name) contains the actual MIB data secured (or not) according to the mechanism described by the first octet (i.e. the Message Field Name). To assist in illustrating how this secured data would appear and additionally to approximate the number of octets, the descriptions and succeeding octets for the value portion are provided and described with respect to FIG. 4 to FIG. 7. The value part of the secure data object as it appears in the message protocol is described utilizing four descriptors. First, the value part of the message is described via the Message Field Name, which is utilized to identify the message part by name. Second, the value part of the message is further described by the Octet Number, which is utilized to indicate the relative position of the field within the secured data object value part. Third, the value part of the message is described by the Description, which is utilized to describe the contents of the octet. Fourth, and finally, the value part of the message is described by the Security indicator, which is utilized to describe whether or not the octet of the secure data values part is or is not opaque.

Those skilled in the art will appreciate that since any security mechanism may be applied to the value portion, with the appropriate Message Field Name assigned to it, the actual value part secured data description would vary according the number of octets utilized. Thus, it can be appreciated that it is not a necessary feature of the present invention to implement a specific or particular number of octets for security purposes. Instead, a general extensible mechanism for security data value portions is discussed and illustrated herein, in accordance with a preferred embodiment of the present invention. FIG. 4, FIG. 5, FIG. 6 and FIG. 7 essentially illustrate and describe variations of the VARBIND value portion, as modified by the secure filter depicted in FIG. 1 (i.e., secure filter 11).

Figure 4:
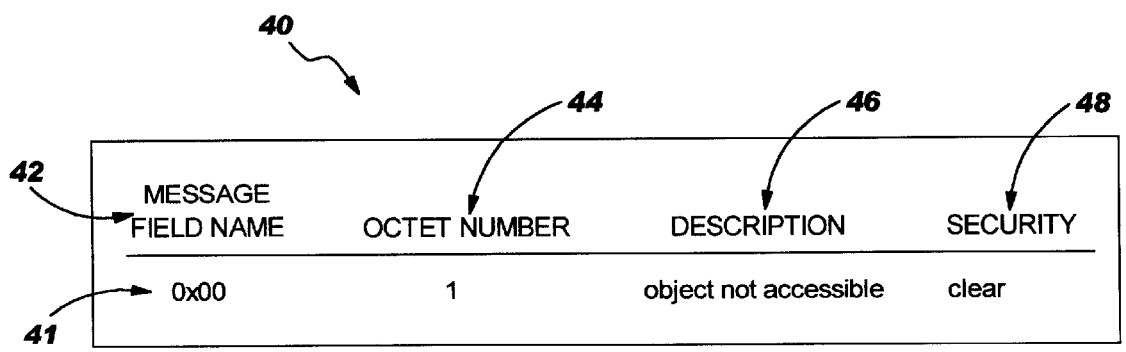
FIG. 4 depicts a block diagram of a level of security in which data values may not be accessed or set, according to a preferred embodiment of the present invention.

Thus, several levels of security are possible for each textual convention. FIG. 4 depicts a block diagram 40 of data entry fields describing a level of security in which data values and objects may not be accessed, according to a preferred embodiment of the present invention. In FIG. 4, a value of "0x00" is listed beneath a Message Field Name 42 and corresponds to a security algorithm in which data values and objects are not accessible. The "0x00" value is indicated beneath Message Field Name 42 as reference numeral 41. The labels depicted in FIG. 4 beneath the Message Field Name represent a further refinement of the configuration and form provided in FIG. 3, and are message format component descriptors. The value part message octets may be described at follows: for the message format depicted in FIG. 4, the Message Field Name "0x00" is associated with the message octet number "1" described beneath heading 44, the description "object not accessible" described beneath heading 46, and the security value "clear" described beneath heading 48, indicating that no authentication and no security has been applied to the data, and further indicating that no data is present in this message, which is essentially utilized as a transaction rejection indicator.

Figure 5:
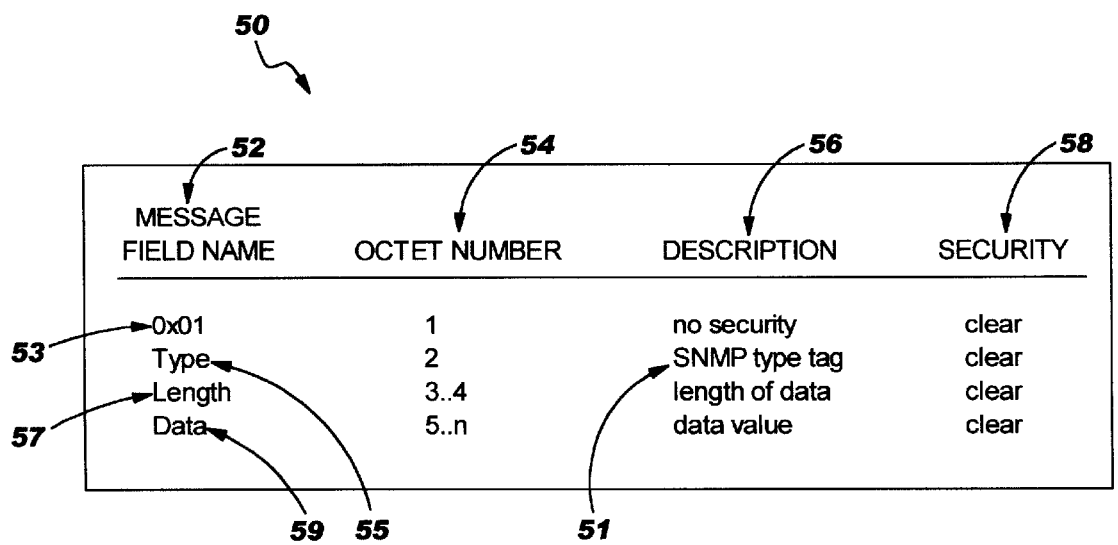
FIG. 5 depicts a block diagram of a level of security in which authentication or encryption are not activated, according to a preferred embodiment of the present invention.

FIG. 5 depicts a block diagram 50 of a level of security in which authentication or encryption are not activated, according to a preferred embodiment of the present invention. In FIG. 5, the following value is assigned to the Message Field Name 52: "0x01" (no authentication, no encryption). The value "0x01" is depicted in FIG. 5 beneath Message Field Name 52 as reference numeral 53. The labels depicted in FIG. 5 beneath the Message Field Name represent a further refinement of the configuration and form provided in FIG. 3, and are message format component descriptors. The value part message octets can be described as follows: for the message format depicted in FIG. 5, the Message Field Name "0x0" is associated with the message octet number "1" described beneath heading 54, the description "no security" described beneath heading 56, and the security value "clear" described beneath heading 58, indicating no authentication and that no security has been applied to the data. "Type" is associated with the message octet number "2" described beneath heading 54, the description "SNMP Tag Type" described under heading 56, and the security value "clear" described beneath heading 58, indicating the new "Textual Convention" described herein. The data, however, is primitive in form (i.e., not converted to a secure form). "Length" is associated with the message octet numbers "3 . . . 4" described beneath heading 54, the description "length of data" described under heading 56, and the security value "clear" described beneath heading 58, indicating the length of the data that follows. "Data" is associated with the message octet numbers "5 . . . n" described under heading 54, the description "data value" described under heading 56, and the security value "clear" described under heading 58, indicating that the data value is not secure.

FIG. 6 depicts a block diagram 60 of a level of security in which authentication but no encryption exists, according to a preferred embodiment of the present invention. The labels depicted in FIG. 5 beneath the Message Field Name represent a further refinement of the configuration and form provided in FIG. 3, and are message format component descriptors. The value part message octets may be described as follows: for the message format depicted in FIG. 6, the Message Field Name "0x02" is associated with the message octet number "1" described beneath heading 64, the description "authentication" described beneath heading 66, and the security value "clear" described beneath heading 68, indicating that authentication may be utilized to validate the message sender. "Type" is associated with the message octet number "2" described beneath heading 64, the description "SNMP Tag Type" depicted beneath heading 66, and the security value "clear" described beneath heading 68, indicating the new "Textual Convention" described herein. The data, however, is primitive in form (i.e., not converted to a secure form). "Length" is associated with the message octet numbers "3 . . . 4" described beneath heading 64, the description "length of data" described beneath heading 66, and the security value "clear" described beneath heading 68, indicating the length of the data that follows. "Data" is associated with the message octet numbers "5 . . . n" described beneath heading 64, the description "data value" described beneath heading 66, and the security value "clear" described beneath heading 68, indicating that the data value is not secure. "+SHA-1 digest" is associated with the message octet numbers "5+n+1+20" described beneath heading 64, the description "data value" described beneath heading 66, and the security value "digest" described beneath heading 68, indicating that an authentication digest is supplied for sender verification.

FIG. 7 depicts a block diagram 71 of a level of security in which a secure MIB data message format with encryption and authentication can exist, according to a preferred embodiment of the present invention. The labels depicted in FIG. 7 beneath the Message Field Name represent a further refinement of the configuration and form provided in FIG. 3, and are message format component descriptors. The value part message octets can be described as follows: for the message format depicted in FIG. 7 the Message Field Name "0x03" is associated with the message octet number "1" described beneath heading 74, the description "privacy/authentication" described beneath heading 76, and the security value "clear" described beneath heading 78, indicating that both privacy and authentication are utilized to validate the message and its sender. "+DES seed" is associated with the message octet number "2 . . . 9" described beneath heading 74, the description "initialization vector" described beneath heading 76, and the security value "clear" described beneath the heading 78, indicating the privacy seed utilized to generate the secure encoding of the data "DESEncryptedData" is associated with the message octet numbers "10 . . . 10+n" described beneath heading 74, the description "secured data" described beneath heading 76, and the security value "encrypted" described beneath heading 78, indicating that the data value is encrypted. "+SHA-1digest" is associated with the message octet numbers "10+n+1+20" described beneath heading 74, the description "secured data" described beneath heading 76, and the security value "digest" described beneath heading 78, indicating an authentication digest is supplied for sender verification. The remainder of FIG. 7, beginning with the word "where:" is explanatory and details the general contents of the message. Note that the acronym "DES" represents the phrase "Data Encryption Standard."

This method of mapping SNMP primitive data types into secure strings can also be applied to derived types defined in SNMP. A derived type is one whose definition has been standardized with a special Abstract Syntax Notation One (ASN. 1) tag but whose base type is one of the set of SNMP primitive types listed above. It allows development of specific reoccurring uses to be standardized. The following is a list of these extended types called APPLICATION types: network address (IP address), counter, gauge, timeticks, and opaque. The APPLICATION types: network address and opaque are derived from OCTET STRING, while counter and gauge are derived from INTEGER.

A formal definition in SNMP of the SNMP primitive data type is as follows: SecureOCTETSTRING, SecureINTEGER, SecureObjectIdentifier. A key aspect of the invention presented herein is that the primitive or base type of the data, (i.e., INTEGER or OCTETSTRING) is preserved, but the secured data is always converted to an OCTET STRING format as a result of the application of the security mechanism. A receiver of this secure VARBIND value part can, if the MIB is available, examine the MIB for the Textual Convention and apply the security algorithm to convert the secure VARBIND value back to the primitive base type of the data. This conversion is possible of course only if the receiver know the security secrets. If the receiver does not now the security secrets, the receipt of the secure VARBIND value will no cause an error. It will mean that for a specific Object Identifier, the value information will not be known since it is encrypted. However, the value portion of the secure VARBIND may still be displayed as an OCTET STRING if necessary, but its meaning will not be determined.

FIG. 8, FIG. 9, and FIG. 10 respectively illustrate opaque syntax conventions, in accordance with a preferred embodiment of the present invention. FIG. 8 is a block diagram 80 illustrative of an octet string syntax, in accordance with a preferred embodiment of the present invention. In FIG. 8, the syntax presented describes an octet string to which a security mechanism may be applied. The output of the security is an octet string. The description of the security mechanism is provided by a single octet security descriptor field that precedes the secured data. The level of security on the data and the security mechanism used to protect the data may vary according to the security descriptor field. The security mechanism is described and illustrated in FIG. 5 to FIG. 7 herein. In addition, FIG. 8 presents a particular object definition 82 for the "SecureOctetString" syntax.

FIG. 9 is a block diagram 90 illustrative of a secure integer syntax, in accordance with a preferred embodiment of the present invention. In FIG. 9, the syntax presented describes an INTEGER to which a security mechanism may be applied. The output of the security transform is an octet string. The description of the security mechanism is provided by a single octet security descriptor field that precedes the secured data. The level of security on the data and the security mechanism used to protect the data may vary according to the security descriptor field. The security mechanism itself is described and illustrated in FIG. 5 to FIG. 7 herein. An object definition 92 for the "SecureINTEGER" syntax" is also indicated in FIG. 9.

FIG. 10 is a block diagram 100 illustrative of an object identifier syntax as a value or data, in accordance with a preferred embodiment of the present invention. In FIG. 10, the syntax presented describes an Object Identifier to which a security mechanism may be applied. The output of the security mechanism is provided by a single octet security descriptor field that precedes the secured data. The level of security on the data and the security mechanism used to protect the data may vary according to the security descriptor field. The security mechanism itself is described and illustrated in FIG. 5 to FIG. 7 herein.

An object definition 102 for the "SecureObjectIdentifier" syntax is also indicated in FIG. 10.

The invention described herein additionally provides a mechanism that can protect against an operational attack against the data. SNMP MIB data is defined to exist in a specific MIB table or scalar object. All instances of MIB data information (OBJECTs) in the table are not protected by the security mechanism described herein. Thus, the table objects require additional protection. Table objects are subject to creation and deletion by network managers and browsers since they are part of a row (or instance) of a table. This is a normal feature of SNMP. However, this feature can create detrimental effects if secured data exists in the MIB definition of the row instance and the row itself is not protected. Therefore, a mechanism is required to protect the instance that contains one or more secure data type information variables (OBJECTs). This can be accomplished by defining a convention for row manipulation that is also secure. Normal table definition and good practice requires the use of the SNMP information convention, referred to as "RowStatus". RowStatus is an indicator of the validity of the information contained in the table for a particular row. By changing the value of "RowStatus," a row may be created or destroyed. If secure information is present in a table and the "RowStatus" field is not also protected, an attack on the "RowStatus" could invalidate the secure entries in the row. To prevent such an attack, the access and value of the "RowStatus" field can be secured by the security mechanism described herein, in accordance with a preferred embodiment of the present invention. The result is that while the "RowStatus" of the table for a row may be read, its actual status can not be understood without knowledge of the security mechanism itself. In addition, the ability to alter the values of the "RowStatus" field can not occur without correct use of the security mechanism.

In an alternative embodiment of the present invention, it is possible to define a new APPLICATION type referred to as "secureData". Doing so would require the standardization of a new APPLICATION tag by an international standards body and additionally making the security mechanism part of the SNMP definition. If this approach were adopted, any manager receiving the new APPLICATION tag for "secureData" in a value portion of a VARBIND would know that a procedure to decode the value portion was necessary. The encrypted data of the value part of the VARBIND, however, would still flow as defined in this invention with the format given. The only difference is that instead of several secure Textual Conventions, a single APPLICATION tag would be used, replacing the need for a separate Textual Convention for each data type primitive or other structure to be secured. In order to determine the base primitive of APPLICATION type of the data, decryption would be applied first, and then the primitive tag which is part of the encrypted data in the format described herein, would be revealed for processing of the value portion by the receiver. Such an alternative approach results in added benefit. The MIB definition is not required to be known by a receiver of a secure VARBIND value, because the tag is part of the universal standard syntax. This, however, represents a simplification and extension for ease of use only, according to an alternative preferred embodiment of the present invention.

In order to provide greater security for confidential MIB data while it is in transit in a computer network, an additional extension that may be implemented in accordance with a preferred embodiment of the present invention is simply to add time relevance or currency to the information message that is being transmitted. Such an extension permits the receiver of a message with or without secure data to consider whether or not the message has been delayed. The currency of the message is important to the receiver because it may indicate a security attack referred to as "replay," "playback," or "delayed play". Malicious users may attempt to, copy a message in transit in the computer network, hold the message, and then resend the message without tampering with it. The effect in the unsuspecting receiver of the message replay is to repeat the action indicated by the attacking message. This problem of replaying authorized messages is solved by providing a time currency window during which the message is validated. Any message received outside the window is considered old and discarded. This time currency window can be added as a component of the present invention described herein.

There are several advantages to the invention described herein. First, the definition of the mechanism is straightforward. Second, the mechanism does not effect the operation of the basic (data) type in any manner. Third, sensitive and non-sensitive MIB data may coexist in the same MIB table and all normal manipulation of non-sensitive data can occur. Fourth, sensitive MIB data fields in table are protected in both read and write modes. Fifth, the access to the sensitive and non-sensitive data in a MIB is identical to the current practice and no distinction needs to be made on behalf of a non-authorized network manager or browser. If the security mechanism is not applied, there will be no ill effects, but secure data will not be compromised. Sixth, the general operation of a MIB table as controlled by a specific MIB object (i.e., "RowStatus"), may itself be protected, thereby ensuring that secure information is not deleted or created by unwarranted network managers or browsers. Seventh, the mechanism can be applied to other APPLICATION tags, such as "Display String" or "counter32" and is therefore extendible.

Figure 11:
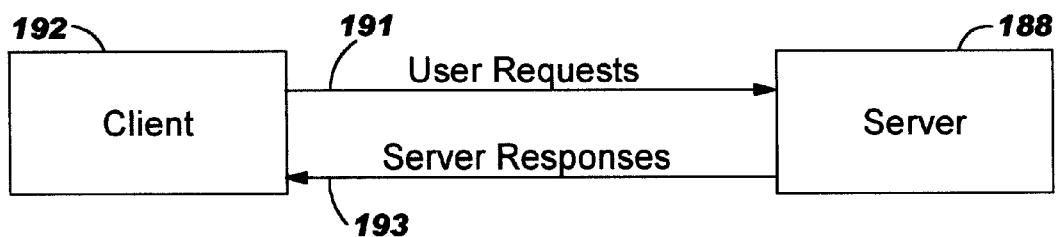
FIG. 11 illustrates a block diagram illustrative of a client/server architecture which can be utilized to implement the method and system of the present invention.
Figure 12:
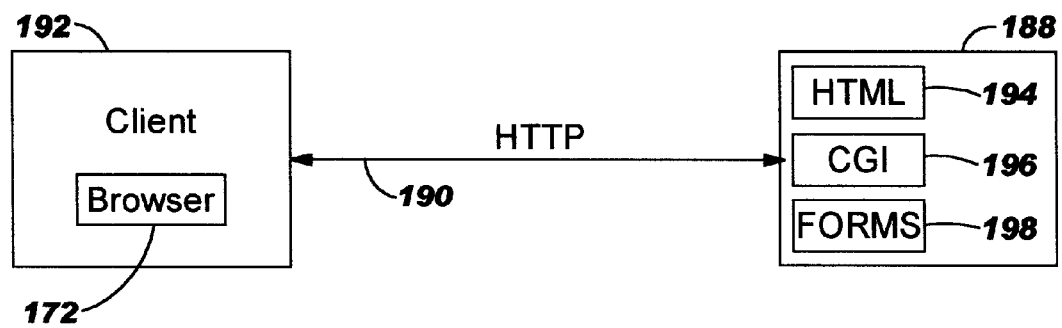
FIG. 12 depicts a detailed block diagram illustrative of a client/server architecture which can be utilized to implement the method and system of the present invention.
Figure 13:
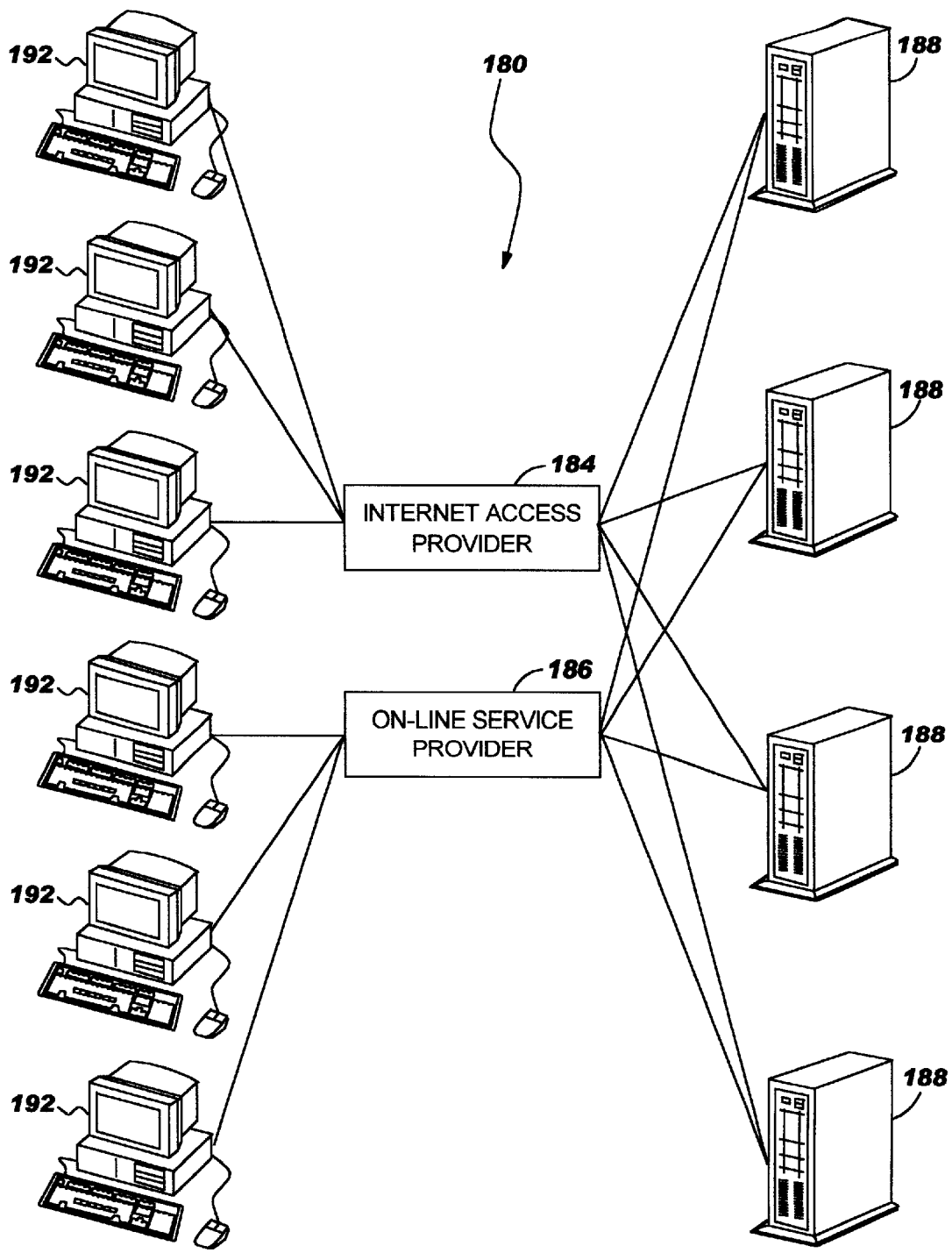
FIG. 13 is a diagram illustrative of a computer network which can be implemented in accordance with the method and system of the present invention.

With reference now to the figures and in particular with reference to FIG. 11, there is depicted a pictorial representation of a client/server architecture in which the present invention may be implemented. FIG. 11 illustrates a block diagram illustrative of a client/server architecture which can be utilized in accordance with the method and system of the present invention. Those skilled in the art will appreciate that the computer network in which a preferred embodiment of the present invention may be implemented does not necessarily need to be configured as a client/server computer network. Other types of computer networks may be implemented in accordance with a preferred embodiment of the present invention. FIG. 11 to FIG. 13 discussed herein are presented for illustrative purposes only. In FIG. 11, user requests 191 for news are sent by a client application program 192 to a server 188. Server 188 can be a remote computer system accessible over a remote network such as the Internet. Server 188 performs scanning and searching of raw (e.g., unprocessed) information sources (e.g., newswire feeds or newsgroups) and, based upon these user requests, presents the filtered electronic information as server responses 193 to the client process. The client process may be active in a first computer system, and the server process may be active in a second computer system and communicate with the first computer system over a communications medium, thus providing distributed functionality and allowing multiple clients to take advantage of the information-gathering capabilities of the server. In FIG. 11, FIG. 12, and FIG. 13, like parts are indicated by like numbers.

FIG. 12 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 192 and server 188 communicate using the functionality provided by HTTP. Active within client 192 is a first process, browser 172, which establishes the connections with server 188, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 188 executes the corresponding server software which presents information to the client in the form of HTTP responses 190. The HTTP responses 190 correspond with web "pages," which can be represented by utilizing Hypertext Markup Language (HTML), or other data generated by server 188. For example, under the Mosaic-brand browser, in addition to HTML functionality 194 provided by server 188, a Common Gateway Interlace (CGI) 196 is provided which allows the client program to direct server 188 to commence execution of a specified program contained within server 188. This may include a search engine which scans received information in the server for presentation to the user controlling the client. Using this interface, and HTTP responses 190, the server may notify the client of the results of that execution upon completion. Common Gateway Interlace (CGI) 196 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 198), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 13 is a diagram illustrative of a computer network 180 which can be implemented in accordance with the method and system of the present invention. Computer network 180 is representative of a remote network, specifically the Internet, a known computer network based on the client-server model discussed earlier. Conceptually, the Internet includes a large network of servers 188 which are accessible by clients 192, typically users of personal computers, through some private Internet-access provider 184 (e.g., such as Internet America) or an on-line service provider 186 (e.g., such as America On-Line, Prodigy, Compuserve, and the like). Each of the clients 192 may run a browser, a known software tool utilized to access servers 188 via the access providers 184. Each server 188 operates a web site which supports files in the form of documents and pages. A network path to servers 188 is identified by a Universal Resource Locator having a known syntax for defining a network collection.

Figure 14:
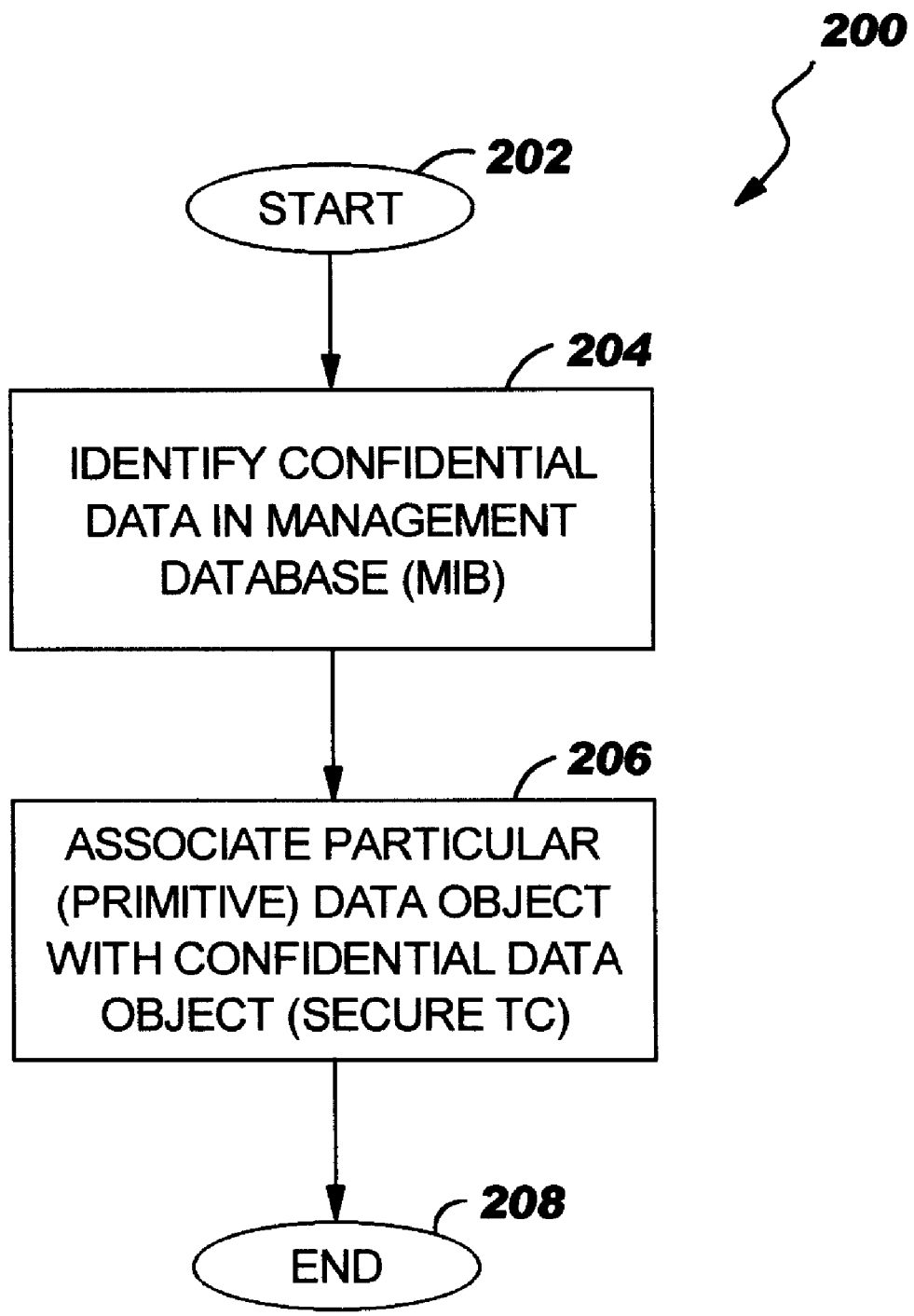
FIG. 14 illustrates a high-level flowchart of operations illustrating a method for securing confidential data maintained in a management information database, in accordance with a preferred embodiment of the present invention.

FIG. 14 and FIG. 15 illustrate a method for securing confidential data maintained in a management information database (e.g., MIB), in accordance with a preferred embodiment of the present invention. It can be appreciated by those skilled in the art that FIG. 14 and FIG. 15 present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "identifying," "releasing," or "comparing," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

It is important to note that, while the present invention has been (and will continue to be) described in the context of a fully functional computer network, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives and CD ROMs, and transmission-type media such as digital and analog communication links. Examples of transmission-type media include devices such as modems, well known in the art of computer networking and computer communications. The term "media" as utilized herein is a collective word for the physical material such as paper, disk, CD-ROM, tape and so forth, utilized for storing computer-based information.

FIG. 14 thus depicts a high-level flowchart of operations 200 illustrating a method for securing confidential data maintained in a management information database, in accordance with a preferred embodiment of the present invention.

Thus, as depicted at block 202 in FIG. 14, the process begins. As indicated at block 204, confidential data within a management information database, such as an MIB, within a computer network, such as the client/server network illustrated by way of example in FIG. 11 to FIG. 13 herein, are identified. This confidential data is associated with particular data objects (i.e., primitive data types, such as those described herein), as illustrated at block 206. The operations described at blocks 204 and 206 of FIG. 14 are performed as analysis and database (MIB) definition steps, in order to prepare the database (MIB) for the runtime processes described in FIG. 15.

FIG. 15 depicts a high-level flowchart of operations 300 further illustrating a method for securing confidential data maintained in a management information database, in accordance with a preferred embodiment of the present invention. Thus, as indicated at block 302 in FIG. 15, the process is initiated. As illustrated thereafter at block 304, a test is performed to determine whether or not to access confidential data utilizing a network device. An example of such a network a device is a so-called "browser," well known in the computer networking arts. If it is determined not to access the confidential data from the database, then as illustrated at block 320 the process simply ends. However, if it is determined to access the confidential data, then as indicated at block 306, further testing is performed in order to determine if access to the confidential data is appropriate. If such access is appropriate, then as described at block 308, a specific indication may be provided according to the encoding described previously with respect to FIG. 4. Thereafter, the process simply ends. If the access "check" depicted at block 306 is successful, or if it is not utilized, the process continues, as indicated thereafter at block 310. As illustrated at block 310, a test is performed to determine whether creating or updating of confidential data will be performed. If the creating or updating of confidential data is to be performed, as provided by a "YES" indication, then as illustrated at block 312, data from the input message is associated and converted to primitive data as described herein. Then, as depicted at block 314, primitive data is stored in the database (MIB) and associated memory of the network device. Thereafter, the process terminates, as indicated at block 320. If, however, a "NO" indication is provided, as indicated at block 310, simple retrieval of information subsequently takes place. Thus, as indicated at block 316, each particular data primitive data object is associated with a confidential data object. Each primitive data object is then converted into a secure data object according to the association described at block 318. The process then ends, as illustrated at block 320. Note that upon the release of the confidential data from the database (MIB), the confidential data may also be updated, modified, and stored in a memory location for further usage.

Based on the foregoing, those skilled in the art can appreciate that a substantial advance over the prior art can be implemented, in accordance with a preferred embodiment of the present invention. A key difference between the present invention and prior art techniques is that there exists no restriction in requesting the MIB data itself. No requirement exists to have MIB views by the community to determine if access is permitted. The present invention does not explicitly restrict users from seeing data, since without the decryption keys available, such users will not be able to actually use the data, which differs from the prior art techniques described herein of not allowing data at all and the administrative complexity required to keep and process messages, while maintaining views in both managers and target agents. The present invention describes a format that permits several different security methods to be applied to MIB data, independent of any textual conventions utilized, by allowing several different security descriptor field values. Those skilled in the art will appreciate however, that as described herein, the present invention does not address a method for configuring these identifier values to operate with the textual conventions utilized in a network device, because this is a configuration matter and not important to implementing a preferred embodiment of the present invention. The concept of textual conventions means that a data object is being associated with the security mechanism via an abstract definition that does not effect the data in its underlying operation, but provides it instead with two "appearances" (i.e., "primitive" within the system, and "secure" outside the system). In essence, the present invention described herein illustrates a method and system for associating abstract data objects with a security filter mechanism and incorporating this modified information, in both a secure and non-secure manner, in a message protocol, which can be understood by receiving parties according to their particular security privileges.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. For example, although a network management protocol (e.g., SNMP) may be utilized in association with a preferred embodiment of the present invention, the present invention can be utilized with any message protocol to protect any data fields, not merely network management information. The description as set forth is not intended to be exhaustive or to limit the invention to the precise form disclosed. Many modifications and variations are possible in light of the above teaching without departing from the spirit and scope of the following claims.

What is claimed is:

1. A method for securing confidential data in a computer network, wherein said computer network includes a management information database that assists in the management of said computer network, said method comprising the steps of:

identifying confidential data within said management information database;

associating particular data objects with said identified confidential data;

accessing said identified confidential data from said management information database; and automatically converting each particular data object and its associated confidential data into a secure data object, in response to an accessing of said confidential data from said management information database, such that said confidential data may only be understood or altered external to said management information database by converting said secure data object back into said particular data objects and said associated confidential data.

2. The method of claim 1 wherein the step of associating particular data objects with said identified confidential data, further comprises the step of:

associating particular data objects with said identified confidential data via a message protocol.

3. The method of claim 2 further comprising the step of:

defining particular data objects that can be manipulated by network devices.

4. The method of claim 3 wherein the step of associating particular data objects with said identified confidential data, further comprises the step of:

associating particular data objects with said identified confidential data, wherein said particular data objects comprise primitive data objects.

5. The method of claim 4 wherein the step of automatically converting each particular data object and its associated confidential data into a secure data object, in response to an accessing of said confidential data from said management information database, such that said confidential data may only be understood or altered external to said management information database by converting said secure data object back into said particular data objects and said associated confidential data, further comprises the step of:

automatically converting each particular data object and its associated confidential data into a secure data object, in response to an accessing of said confidential data from said management information database, such that said confidential data may only be understood or altered external to said management information database by converting said secure data object back into said particular data objects and said associated confidential data, wherein said secure data object comprises an opaque data object.

6. The method of claim 5 further comprising the steps of:

modifying said identified confidential data; and storing said identified confidential data in a memory location.

7. The method of claim 6 wherein the step of modifying said identified confidential data further comprises the step of:

creating said confidential data.

8. The method of claim 7 wherein the step of associating particular data objects with said identified confidential data via a message protocol, further comprises the step of:

associating particular data objects with said identified confidential data via a message protocol, wherein said message protocol comprises a network management protocol.

9. The method of claim 8 wherein the step of accessing said identified confidential data from said management information database, further comprises the step of:

releasing said identified confidential data from said management information database, in response to accessing of said confidential data by a network device.

10. The method of claim 9 further comprising the step of:

retrieving said identified confidential data from said management information database.

11. The method of claim 10 further comprising the step of:

updating said confidential data.

12. The method of claim 11 further comprising the step of:

deleting said confidential data, in response to a particular user input.

13. A system for securing confidential data in a computer network, wherein said computer network includes a management information database that assists in the management of said computer network, said system comprising:

means for identifying confidential data within said management information database;

means for associating particular data objects with said identified confidential data;

means for accessing said identified confidential data from said management information database; and means for automatically converting each particular data object and its associated confidential data into a secure data object, in response to an accessing of said confidential data from said management information database, such that said confidential data may only be understood or altered external to said management information database by converting said secure data object back into said particular data objects and said associated confidential data.

14. The system of claim 13 wherein said means for associating particular data objects with said identified confidential data, further comprises:

means for associating particular data objects with said identified confidential data via a message protocol.

15. The system of claim 14 further comprising:

means for defining particular data objects that can be manipulated by network devices.

16. The system of claim 15 wherein said particular data objects comprise primitive data objects.

17. The system of claim 16 wherein said secure data object comprises an opaque data object.

18. The system of claim 17 further comprising:

means for modifying said identified confidential data; and means for storing said identified confidential data in a memory location.

19. The system of claim 18 wherein said means for modifying said identified confidential data further comprises:

means for creating said confidential data.

20. The system of claim 19 wherein said message protocol comprises a network management protocol.

21. The system of claim 20 further comprising:

means for releasing said identified confidential data from said management information database, in response to an accessing of said confidential data by a network device.

22. The system of claim 21 further comprising:

means for retrieving said identified confidential data from said management information database.

23. The system of claim 22 further comprising:

means for updating said confidential data.

24. The system of claim 23 further comprising:

means for deleting said confidential data, in response to a particular user input.

25. A program product residing in a computer memory in a computer for securing confidential data in a computer network, wherein said computer network includes a management information database that assists in the management of said computer network, said program product comprising:

instruction means residing in a computer for identifying confidential data within said management information database;

instruction means residing in a computer for associating particular data objects with said identified confidential data;

instruction means residing in a computer for accessing said identified confidential data from said management information database; and instruction means residing in a computer for automatically converting each particular data object and its associated confidential data into a secure data object, in response to an accessing of said confidential data from said management information database, such that said confidential data may only be understood or altered external to said management information database by converting said secure data object back into said particular data objects and said associated confidential data.

26. The program product of claim 25 wherein said instruction means residing in a computer for associating particular data objects with said identified confidential data, further comprises:

instruction means residing in a computer for associating particular data objects with said identified confidential data via a message protocol.

27. The program product of claim 26 further comprising:

instruction means residing in a computer for defining particular data objects that can be manipulated by network devices.

28. The program product of claim 27 wherein said particular data objects comprise primitive data objects.

29. The program product of claim 28 wherein said secure data object comprises an opaque data object.

30. The program product of claim 29 further comprising:

instruction means residing in a computer for modifying said identified confidential data; and instruction means residing in a computer for storing said identified confidential data in a memory location.

31. The program product of claim 30 wherein said instruction means residing in a computer for modifying said identified confidential data further comprises:

instruction means residing in a computer for creating said confidential data.

32. The program product of claim 31 wherein said message protocol comprises a network management protocol.

33. The program product of claim 32 further comprising:

instruction means residing in a computer for releasing said identified confidential data from said management information database, in response to an accessing of said confidential data by a network device.

34. The program product of claim 33 further comprising:

means for retrieving said identified confidential data from said management information database.

35. The program product of claim 34 further comprising:

means for updating said confidential data.

36. The program product of claim 35 further comprising:

means for deleting said confidential data, in response to a particular user input.

37. The program product of claim 36 wherein each of said instruction means further comprise signal bearing media.

38. The program product of claim 37 wherein said signal bearing media comprises transmission media.

39. The program product of claim 37 wherein said signal bearing media comprises recordable media.

* * * * *